Sept. 22, 1964 SHIGEO AIKI ETAL 3,149,591

BUTTONHOLE STITCHING DEVICE IN ZIGZAG SEWING MACHINES

Filed Feb. 6, 1962 3 Sheets-Sheet 1

INVENTORS
SHIGEO AIKI &
RENJI KOIKE
BY
Mason, Fenwick & Lawrence
Attorneys

BUTTONHOLE STITCHING DEVICE IN ZIGZAG SEWING MACHINES

Filed Feb. 6, 1962 3 Sheets-Sheet 2

INVENTORS
SHIGEO AIKI &
RENJI KOIKE
BY
Mason, Fenwick & Lawrence
Attorneys

BUTTONHOLE STITCHING DEVICE IN ZIGZAG SEWING MACHINES

Filed Feb. 6, 1962

INVENTORS
SHIGEO AIKI &
BY RENJI KOIKE
Mason, Fenwick & Lawrence
Attorneys

United States Patent Office 3,149,591

Patented Sept. 22, 1964

3,149,591

BUTTONHOLE STITCHING DEVICE IN ZIGZAG SEWING MACHINES

Shigeo Aiki, Oaza-Kitasaki, Ohfup-machi, Chita-gun, and Renji Koike, Sarunage-machi, Nishikamo-gun, Aichi-ken, Japan, assignors to Aichi Kogyo Kabushiki Kaisha, Asahicho, Kariya-shi, Aichi-ken, Japan Filed Feb. 6, 1962, Ser. No. 171,392
Claims priority, application Japan Feb. 9, 1961
6 Claims. (Cl. 112—158)

This invention relates to sewing machines and more particularly to a buttonhole stitching mechanism for a sewing machine.

The general object of this invention is to provide a novel mechanism for sewing machines which is adapted for stitching buttonholes.

Another object of this invention is to provide a novel mechanism for sewing machines which is adapted automatically to make several bar tacks at one end of a buttonhole, stitch along one side of the hole, make several bar tacks in the opposite end of the hole and then complete the stitches along the other side of the hole.

A more specific object of this invention is to provide a novel mechanism for sewing machines which is adapted to impart a laterally oscillating motion to a needle bar in the sewing machine which includes means for varying the amplitude of the stitching and laterally shifting the stitching zone.

A further object of the present invention is to provide a novel buttonhole stitching mechanism for sewing machines which is simple in construction and easy to operate.

Other objects and advantages of the present invention will become more apparent to those persons skilled in the art in the following description taken in conjunction with the accompanying drawings, in which.

Figures 1, 2, 3, 4:
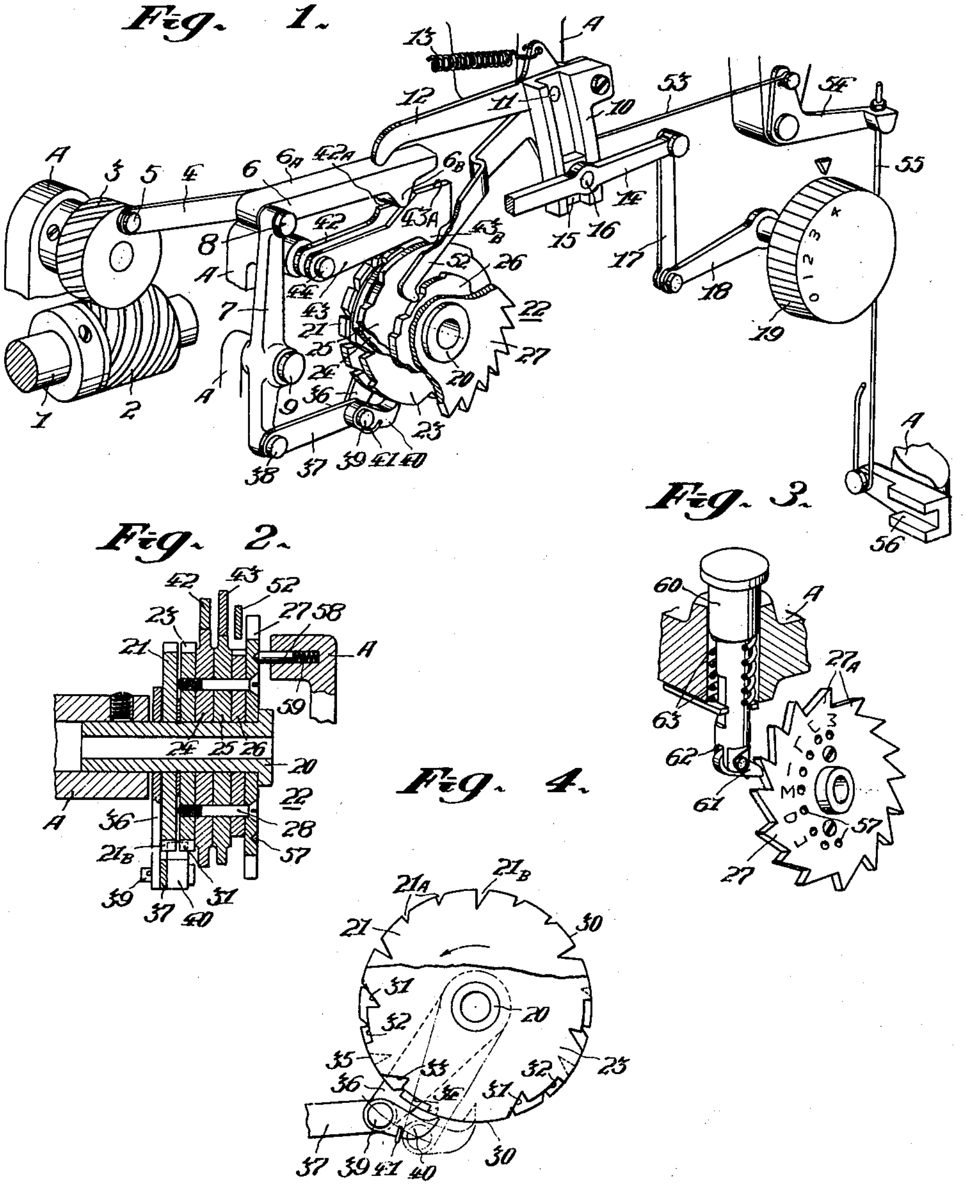
FIG. 1 is a perspective view of an embodiment of the present invention having portions thereof broken away.
FIG. 2 shows in vertical cross section the stationary control shaft section of the embodiment illustrated in FIGURE 1.
FIG. 3 shows the manual indexing means utilized with the embodiment illustrated in FIGURE 1.
FIG. 4 shows an enlarged front view of the indexing means illustrated in FIGURE 1, having portions thereof broken away.

FIG. 5 through FIG. 9 inclusive illustrate each set of relative positions of the controlling members in contrast with each stage of the buttonhole working.

Referring now to the drawings, gear 2 is rigidly mounted on the main shaft 1 which is rotatably supported on the frame A of the machine and is arranged to be rotated at a constant speed by an appropriate drive. Numeral 3 designates a gear mounted on a shaft which is journaled in the frame A. A linking member 4 is pivotally connected at one end thereof to a radially offset position on gear 3 by means of a pin 5, and at the other end thereof to a reciprocable follower member 6 and one end of a lever 7 by means of a pin 8. Lever 7 is pivoted at its intermediate point by pin 9 studded to the frame A.

Grooved lever member 10, which is supported from frame A by means of a pivot shaft 11, has an arm portion 12 extending toward the reciprocable follower member 6 and engages the upper surface 6A thereof. The end of the arm portion 12 of the lever member 10 is urged into engagement with the surface 6A of the follower member 6 by means of a spring member 13. Connecting lever 14, has one end connectable with the needle arm (not shown) and an intermediate portion near the rear end thereof which is pivoted to a square block 15 by means of shaft 16. Square block 15 is arranged to slide in the groove provided in the lever member 10. The rear end of lever 14 connects to the arm 18 of the stitching-width manual adjusting wheel 19 through link 17. With the adjusting wheel 19 set in a given position, the reciprocating motion of connecting lever 14, that is, the width of zigzag stitches and stitching position, will be determined by the up-and-down movement of the contacting point between the top face 6A and the forward end of arm portion 12.

Figures 5, 6, 7:
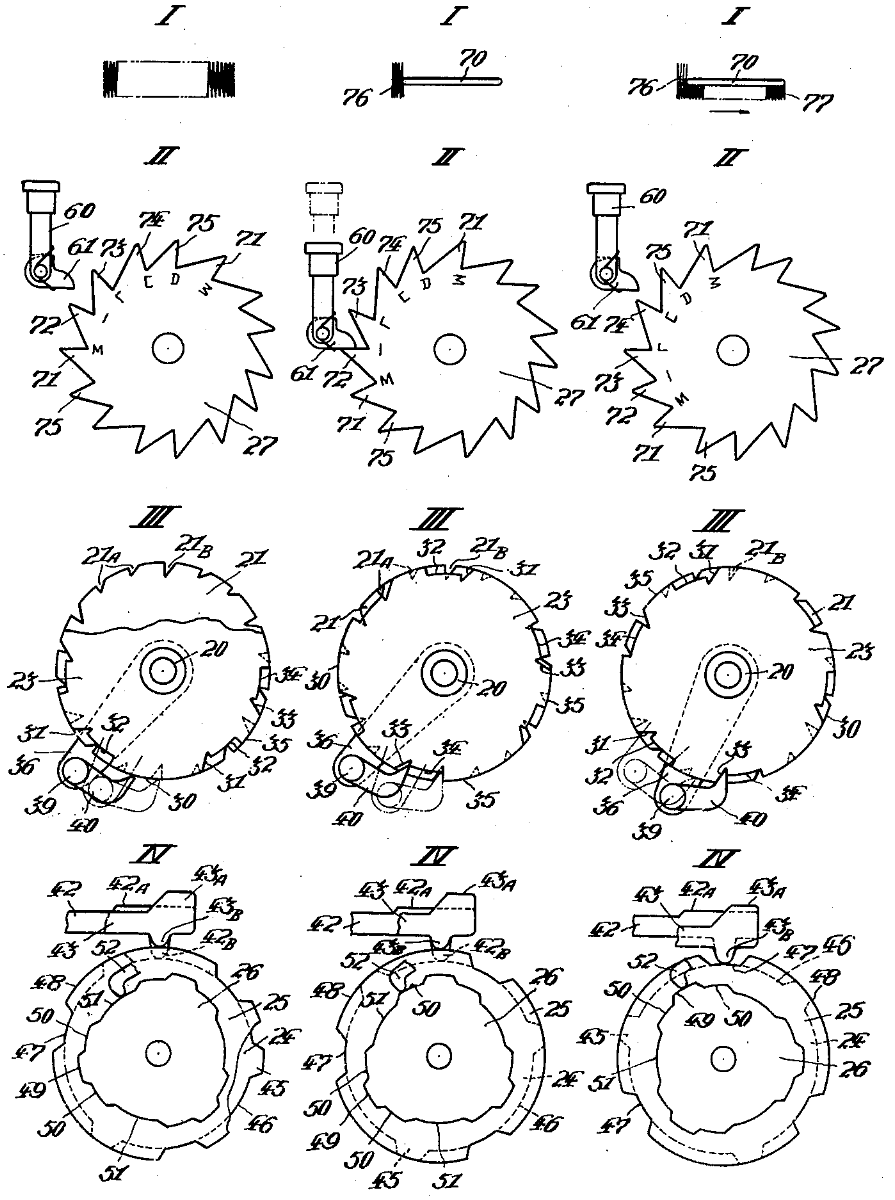

As shown in FIGS. 1 and 2, a ratchet disk 21 and a control disk assembly 22 are mounted rotatably on a stationary control shaft 20, each being freely rotatable relative to the other. The assembly 22 consists of gear disk 23; zigzag stitching control cam disks 24, 25; work-feeding control, cam disk 26; and manual gear disk 27. These disks are secured rigidly together by means of bolts 28. Ratchet disk 21 is provided with 6 deep serrations 21B equidistantly spaced about its periphery, there being two shallow serrations 21A between any two adjacent deep serrations 21B, as shown in FIGS. 4 and 5. The periphery of gear disk 23, coinciding with the periphery of ratchet disk 21 as shown in FIG. 6–III, is notched at intervals so that there are three large arcuate sections 30 equidistantly spaced apart. Between two adjacent large arcuate sections 30 are located a shallow notch 32, a small arcuate section 35 and a shallow notch 34 in that order. Numerals 31 and 33 designate two deep serrations located at the rear ends of shallow notches 32 and 34, one serration for one notch, respectively.

Figure 8:
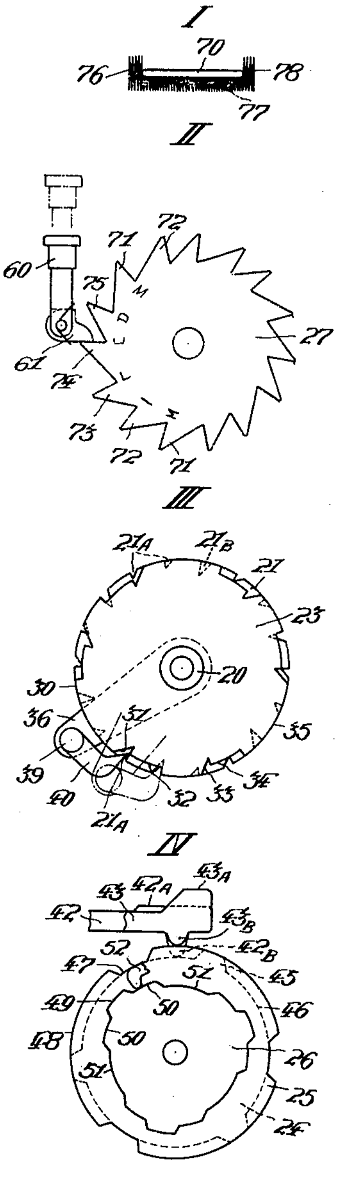

Rocking plate 36 is movably mounted, at its one end, on the control shaft 20 and next to the ratchet disc 21. The free end of plate 36 is connected by means of pin 39 with connecting link 37 which, in turn, is connected with the lower end of lever 7, mentioned above, by means of pin 38. The pin 39 holds pawl 40 whose engaging end is forced against the ratchet disk 21 and gear disk 23 by the preloaded spring 41. In operation, as the main shaft 1 rotates, pawl 40 reciprocates between the two positions, one real and the other phantom, shown in FIG. 5–III. If gear disk 23 stays in the position indicated in FIG. 5–III, pawl 40 merely slides on the large arcuate section 30 without any engagement, but if ratchet disk 21 and gear disk 23 jointly assume the position indicated in FIG. 6–III, pawl 40 reciprocates on and over the shallow notch 34, each reciprocating movement causing the pawl to engage with the shallow serration 21A and to rotate the ratchet disk 21 intermittently. After a few intermittent movements caused by reciprocating pawl 40, or, to be specific, at each third movement in the case illustrated in the drawings, one of deep serrations 21B comes to a position coinciding with a deep serration 33 of gear disk 23. Then, the pawl falls into these matched serrations and moves both the ratchet disk 21 and gear disk 23 simultaneously, shifting the two disks together to the position indicated in FIG. 7–III. Following this displacement, pawl 40 begins to merely slide on and over small arcuate section 35 of gear disk 23. It will be readily seen from the foregoing description that the action of pawl 40 to move the ratchet disk 21 a few times first and then both disks 21 and 23 together will similarly occur when pawl 40 reciprocates on and over shallow notch 32 as shown in FIG. 8–III and FIG. 9–III.

Referring to FIG. 1, between the reciprocable follower member 6 and the zigzag stitching control cam disks 24 and 25 are interposed a follower member 42 defining a movable limit means and a follower 43, both of which are pivoted on pin 44 studded to the frame A. The top surface of follower members 42 and 43 are so constructed as to provide a low cam lobe 42A and a high cam lobe 43A, respectively, upon which the protrusion 6B of follower member 6 rides. The top surface of follower member 43 also is provided with an inclined cam surface sloping downwardly from high cam lobe 43A which also is engaged by the downwardly projecting protrusion 6B of the follower member 6. The protrusions 42B, 43B of the rockers at their undersides, as shown in FIG. 5–IV, ride on the peripheries of the control cam disks 24, 25, respectively. Now, the periphery of control cam 24 is formed into three equidistantly separated arcuate sections 46 separated by three high edges 45, whereas the periphery of control cam 25 is formed into three equidistantly spaced arcuate sections 48 separated by three notches 47. Thus, as control cams 24, 25 rotate in operation, cam lobes 42A, 43A of follower members 42 and 43 move up and down, respectively, to control the width and position of zigzag stitching in the manner which will be described later.

The periphery of the work-feed control cam disk 26 is formed into three equidistantly spaced reverse-feed cam lobes 49, each lobe being followed by feed-stopping lobe 50 and normal-feed lobe 51. Since the lover 52, which is pivoted on shaft 11 as shown in FIG. 1, rides on the control cam disk 26 on one hand but is connected with connecting link 53 on the other, rotation of control disk 26 causes the lever 52 to rock, and this rocking motion is transmitted through connecting link 53, crank 54, and link 55 to the rocking piece 56 for controlling the feeding of work.

Manual gear disk 27 is provided with three groups of teeth, each group consisting of four teeth from tooth 71 through tooth 75 inclusive. A plurality of recesses 57, disposed in a circular pattern, are made in the side of the disk 27, such that a sliding pin 58, which is preloaded with spring 59 and located on frame A, will register with any one of these holes in order to lock the manual disk 27 in that particular position, as shown in FIG. 3 and FIG. 5–II. Referring to FIG. 3, the numeral 60 designates a pushbutton for manually indexing the gear disk 27 and is provided at its bottom end with a pawl 61 for engaging with the gear teeth. Pawl 61 is pinned movably but is prevented from rotating upward. When the pushbutton 60 is pushed down, pawl 61 engages with one of the teeth and causes the gear disk 27 to turn. As the finger is removed from the pushbutton 60, return spring 63 raises the pushbutton 60 to the original position while pawl 61 rides on the teeth under force produced by spring 62 and slides upward without moving the manual gear disk 27 in the opposite direction.

Usual zigzag sewing operation carried out by means of a sewing machine embodying the present invention will be described.

FIG. 5 shows the positions of the members when tooth 71 of manual gear disk 27 has just been pushed down by the pawl 61 of pushbutton 60. Under this condition, pawl 40 is merely sliding back and forth on the large arcuate section 30 as shown in FIG. 5–III, the protrusions 42B, 43B are riding on the low arc 46 and the high arc 48, respectively, and the low cam lobe 42A is held at its lowest position while the high cam lobe 43A is held at its highest position. Hence, the stroke of up-and-down motion due to the reciprocation of follower member 6 having its downwardly extending protrusion 6B riding on the inclined upper surface on follower member 43, shown in FIG. 1, will be maximum, resulting in the maximum width of stitching. Moreover, since lever 52 is riding on the normal-feed cam lobe 51, the zigzag sewing operation of the usual type will continue. The sitching width can be reduced by operating the stitching width manual adjusting wheel 19 previously mentioned.

To be described next is the buttonhole working operation with the use of a sewing machine embodying this invention.

Tooth 72 is to be pushed down first with pawl 61 by pressing down the pushbutton 60 to move the manual gear disk 27 to the position shown in FIG. 6. This movement is accompanied by the shifting of lever 52 to the feed-stopping cam lobe 50, and causes the shallow notch 34 of gear disk 23 to coincide with the stroke of the pawl 40. At the same time, low lobe 42A and high lobe 43A assume the lowest and the highest position, respectively.

Under this condition, the sewing needle is to be brought to one end of the buttonhole 70, as shown in FIG. 6–I, and then stitching is to be commenced. As the stitching is started, the machine operates to make the bar tacks 76. When six stitches of bar tack have been made, deep serrations 33 and 21B become registered, and pawl 40 engages with both of these serrations to automatically move the ratchet disk 21 and gear disk 23 together by an amount corresponding to the stroke of pawl 40, thus bringing these two serrations to the position shown in FIG. 7. In the new position, lever 52 rides on the reverse-feed cam lobe 49 to commence the reverse feeding of work and, at the same time, protrusion 43B falls into notch 47 to lower the high cam lobe 43A, thus halving, approximately, the width of stitches. With this halved stitch width, the machine commences the side stitching 77 as shown in FIG. 7–I, the transition from bar tacks to side stitching being made automatically.

Figure 9:
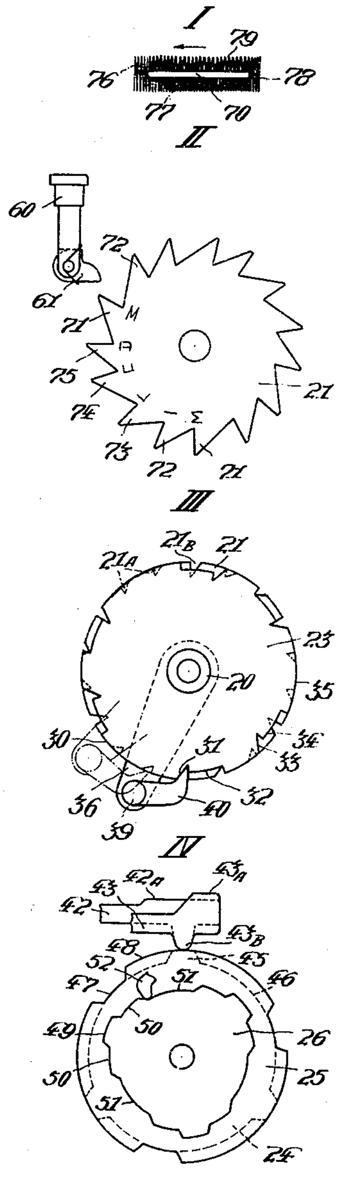

As the side stitching operation progresses to the other end of the buttonhole 70, pushbutton 60 is to be manually depressed. This manual operation causes pawl 61 to move tooth 74 down, turning the gear disk 27 just a little to introduce the positions shown in FIG. 8. Under this new condition, protrusion 43B again rides on the high arc 48, permitting the high cam lobe 43A to come to the original position. This is followed by the shifting of lever 52 to feed-stopping cam lobe 50 and, since the shallow notch 32 is as long in extent as is the stroke of pawl 40, the same action as that which was described for the case of FIG. 6 repeats here. In other words, when 6 stitches of bar tack 78 are finished, deep serrations 31 and 21B coincide with each other and the ratchet disk 21 and gear disk 23 get moved together just a little to assume the position shown in FIG. 9. Under this condition, pawl 40 slides on the large arc, and lever 52 rides on normal-feed cam lobe 51 to commence feeding the work in the normal direction, while protrusion 42B rides on the high edge 45 so that low cam lobe 42A rises halving the width of stitches. Hence, the machine ends bar tacking 78 but begins placing side stitches 79, as shown in FIG. 9–I, at the side of buttonhole opposite to the side stitches 77. When the needle reaches the bar tacks 76, the machine is to be stopped right then, thus completing one cycle of working on buttonhole 70.

Under this invention, the width and position of stitches are to be controlled with the use of reciprocable follower member 6 which is reciprocated along a given line so that it engages the inclined cam surface on the top surface of the follower member 43 to be moved along a line perpendicular to its given line of reciprocation. The amplitude of the perpendicular motion of the reciprocable follower member 6 is controlled by the relative positions of the cam lobes 42A and 43A of the follower members 42 and 43, respectively, having downwardly projecting protrusions 42B and 43B which engage the peripheral cam surfaces of control cam disks 24 and 25 which are attached to work-feed control cam disk 26. The assembly of cam disks 24, 25 and 26 is rotatably mounted on stationary control shaft 20 and is repositioned for adjustment by a manually operated means. Provision also is made for automatically indexing the above assembly of cam disks when each bar-tack stitching is completed. Because of these arrangements, this invention achieves its object by providing a device which is simple and sturdy in construction, is easy to operate and is smooth in operation.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What we claim is:

1. A mechanism for imparting lateral oscillating motion to a needle bar in a sewing machine including means for varying the amplitude of the stitching and laterally shifting the stitching zone comprising a frame, reciprocating means operatively connected to said frame, means operatively connected to said reciprocating means for reciprocating said reciprocating means in coordination with the axially reciprocating motion of said needle bar, first follower means having a cam surface engaging said reciprocating means for translating the reciprocating motion of said reciprocating means to a rocking motion substantially perpendicular to the reciprocating motion of said reciprocating means, interconnecting means engaging said reciprocating means for transmitting the reciprocating rocking motion of said reciprocating means to said needle bar, movable limit means for controlling the engagement of said reciprocating means with the cam surface of said first follower means, first cam means having a cam surface engageable with said first follower means for displacing said first follower means along a line substantially perpendicular to the reciprocating motion imparted to said reciprocating means and second cam means having a cam surface profile for controlling the movement of said movable limit means.

2. A mechanism for imparting lateral oscillating motion to a needle bar in a sewing machine including means for varying the amplitude of the stitching and laterally shifting the stitching zone comprising a frame, reciprocating means operatively connected to said frame, means operatively connected to said reciprocating means for reciprocating the same in coordination with the axially reciprocating motion of said needle bar, first cam follower means having a cam surface engaging said reciprocating means for translating the reciprocating motion of said reciprocating means to a rocking motion substantially perpendicular to the reciprocating motion thereof, lever means pivotally connected to said frame having a portion thereof engaging said reciprocating means for rocking movement therewith, movable limit means for controlling the engagement of said reciprocating means with the cam surface of said first cam follower means, thereby correspondingly controlling the amplitude of oscillating motion transmitted to said lever, first cam means having a cam surface engageable with said first cam follower means for displacing said first follower means along a line perpendicular to the reciprocating motion imparted to said reciprocating means, second cam means having a cam surface profile for controlling the movement of said movable limit means, means interconnecting said lever means and said needle bar for laterally displacing and transmitting oscillating motion to said needle bar responsive to the motion transmitted thereto by said reciprocating means and said means interconnecting said lever means and said needle bar having means for radially adjusting the connection of said interconnecting means and said lever means relative to the pivotal axis of said lever means.

3. A mechanism for imparting lateral oscillating motion to a needle bar in a sewing machine including means for varying the amplitude of the stitching and laterally shifting the stitching zone comprising a frame, reciprocating means operatively connected to said frame, means operatively connected to said reciprocating means for reciprocating said reciprocating means in coordination with the axially reciprocating motion of said needle bar, first cam follower means having a cam surface engaging said reciprocating means for translating the reciprocating motion of said reciprocating means to a rocking motion substantially perpendicular to the reciprocating motion of said reciprocating means, interconnecting means engaging said reciprocating means for transmitting the reciprocating rocking motion of said reciprocating means to said needle bar, movable limit means for controlling the engagement of said reciprocating means with the cam surface of said first cam follower thereby correspondingly controlling the amplitude of oscillating motion transmitted to said interconnecting means, first cam means having a cam surface engageable with said first cam follower means for displacing said first cam follower means along a line substantially perpendicular to the reciprocating motion imparted on said reciprocating means, second cam means having a cam surface for controlling the movement of said movable limit means, the cam surface of said second cam means having a predetermined profile for controlling the movement of said movable limit means in a predetermined sequence, the cam surface of said first cam means having a profile for controlling the displacement of said first cam follower means in a predetermined sequence coordinated with the predetermined sequence of said second cam means and means operatively connected to said frame for advancing said first and second cam means for engagement of said cam surfaces thereof with the engageable said movable limit means and said first cam follower means in said predetermined sequence in coordination with the reciprocating motion imparted on said reciprocating means.

4. A mechanism for imparting lateral oscillating motion to a needle bar in a sewing machine including means for varying the amplitude of the stitching and laterally shifting the stitching zone comprising a frame, a cam shaft journaled in said frame, first and second cams having peripheral cam surfaces rotatably mounted on said cam shaft, a first follower pivotally connected on said frame, said first follower having means engaging the cam surface of said first cam and an inclined surface opposite the cam engaging means, a second follower pivotally connected to said frame, said second follower having means engaging the cam surface of said second cam and a plane surface disposed adjacent the inclined surface of said first follower, said cam surfaces having profiles for radially displacing said followers relative to said cam shaft and relative to each other in a predetermined sequence, a third follower operatively connected to said frame having means engageable with the inclined surface of said second follower and the plane surface of said first follower, means operatively mounted on the frame for imparting reciprocating motion to said third follower in a plane substantially parallel to the plane surface of said second follower whereby the engagement of said third follower with the inclined surface of said first follower imparts a radial reciprocating motion to said third follower relative to said cam shaft having an amplitude determined by the relative position of the plane surface of said second follower limiting the engagement of said third follower with the inclined surface of said first follower and connecting means engageable with said third follower for transmitting the displacement and reciprocating motion of said third follower to said needle bar.

5. A mechanism for imparting lateral oscillating motion to a needle bar in a sewing machine including means for varying the amplitude of the stitching and laterally shifting the stitching zone comprising a frame, a cam shaft journaled in said frame, first and second cams having peripheral cam surfaces rotatably mounted on said cam shaft, a first follower pivotally connected on said frame, said first follower having means engaging the cam surface of said first cam and an inclined surface opposite the cam engaging means, a second follower pivotally connected to said frame, said second follower having means engaging the cam surface of said second cam and a plane surface disposed adjacent the inclined surface of said first follower, said cam surfaces having profiles for radially displacing said followers relative to said cam shaft and relative to each other in a predetermined sequence, a third follower operatively connected to said frame having means engageable with the inclined surface of said second follower and the plane surface of said first follower, means operatively mounted on the frame for imparting reciprocating motion to said third follower in a plane substantially parallel to the plane surface of said second follower whereby the engagement of said third follower with the inclined surface of said first follower imparts a radial reciprocating motion to said third follower relative to said cam shaft having an amplitude determined by the relative position of the plane surface of said second follower limiting the engagement of said third follower with the inclined surface of said first follower, a lever pivotally connected on said frame, said lever having an arm portion engaging said third follower, said lever having a second arm portion, said second arm portion having a radially extending slide groove, a block slidably disposed in said slide, means interconnecting said slide block and said needle bar for displacing and laterally oscillating said needle bar responsive to corresponding motions transmitted to said lever by said first follower and means for radially adjusting said block in said slide relative to the pivot axis of said crank.

6. A mechanism for imparting lateral oscillating motion to a needle bar in a sewing machine including means for varying the amplitude of the stitching and laterally shifting the stitching zone comprising a frame, a cam shaft journaled in said frame, first and second cams having peripheral cam surfaces rotatably mounted on said cam shaft, a first follower pivotally connected on said frame, said first follower having means engaging the cam surface of said first cam and an inclined surface opposite the cam engaging means, a second follower pivotally connected to said frame, said second follower having means engaging the cam surface of said second cam and a plane surface disposed adjacent the inclined surface of said first follower, said cam surfaces having profiles for radially displacing said followers relative to said cam shaft and relative to each other in a predetermined sequence, a third follower operatively connected to said frame having means engageable with the inclined surface of said second follower and the plane surface of said first follower, means operatively mounted on the frame for imparting reciprocating motion to said third follower in a plane substantially parallel to the plane surface of said second follower in coordination with the axially reciprocating motion of said needle bar whereby the engagement of said third follower with the inclined surface of said first follower imparts a radial reciprocating motion to said third follower relative to said cam shaft having an amplitude determined by the relative position of the plane surface of said second follower limiting the engagement of said third follower with the inclined surface of said first follower and indexing means mounted on said cam shaft and operatively connected with said means for imparting reciprocating motion to said third follower for indexing said cam members in said predetermined sequence.

References Cited in the file of this patent

UNITED STATES PATENTS

| | | |
|---|---|---|
| 1,675,508 | Muller | July 3, 1928 |
| 2,684,649 | Scarpa | July 27, 1954 |
| 2,939,413 | Rutishauser | June 7, 1960 |
| 2,979,002 | Casas-Robert et al. | Apr. 11, 1961 |